United States Patent [19]

Reaney

[11] 4,283,164

[45] Aug. 11, 1981

[54] BATTERY MOVER

[76] Inventor: Lawrence A. Reaney, 3713 38th Ave., Brentwood, Md. 20722

[21] Appl. No.: 97,175

[22] Filed: Nov. 26, 1979

[51] Int. Cl.³ .................. B65G 67/04; B65G 67/24
[52] U.S. Cl. ............................ 414/396; 104/34; 414/400; 414/506; 414/515
[58] Field of Search ............... 104/34; 414/14, 18, 414/395, 396, 462, 506, 509, 514, 515, 529, 400, 585

[56] References Cited

U.S. PATENT DOCUMENTS

| | | | |
|---|---|---|---|
| 2,514,752 | 7/1950 | Faulkner et al. | 414/506 X |
| 3,122,244 | 2/1964 | Corso | 104/34 X |
| 3,189,199 | 6/1965 | Eaton | 414/396 |
| 3,259,365 | 7/1966 | Gibson | 104/34 X |
| 3,572,563 | 3/1971 | Oliver | 414/514 |
| 4,082,195 | 4/1978 | Wnek | 414/506 X |
| 4,101,038 | 7/1978 | Palma | 104/34 |
| 4,120,411 | 10/1978 | Johnson | 104/34 X |

Primary Examiner—James L. Rowland
Attorney, Agent, or Firm—James R. Laramie

[57] ABSTRACT

A battery mover for use in horizontally moving batteries into and out of battery compartments in battery powered vehicles and battery powered machinery. The battery mover includes a horizontal support frame having a longitudinal axis, a plurality of rotatable elements positioned along the longitudinal axis for permitting movement of a battery disposed on the frame along the longitudinal axis, a vertical section joined to the horizontal frame, apparatus for aligning the frame with respect to a battery compartment and for preventing relative movement between the battery compartment and the frame during movement of a battery into and out of the battery compartment, a winch for reeling and unreeling a cable, a pusher slidably mounted in the horizontal support frame to permit movement between first and second positions, an extender joined to the pusher which may be positioned to project past the pusher toward the first longitudinal position, apparatus for selectively coupling the cable to the pusher for causing a battery to be moved along the horizontal support frame toward the first position during rotation of the winch and apparatus for selectively coupling the cable to a battery for moving a battery along the horizontal support frame toward the second position.

10 Claims, 3 Drawing Figures

BATTERY MOVER

BACKGROUND OF THE INVENTION

1. Field of the Invention

The invention relates to apparatus used for horizontally moving batteries into and out of battery compartments in battery powered vehicles and battery powered electrical machinery.

2. Description of the Prior Art

Battery movers have been developed which horizontally move battery packs into and out of battery compartments in electrically powered vehicles. These battery movers generally have included roller mechanisms located in a horizontal support to facilitate horizontal movement of the battery packs into and out of battery compartments of the electrically powered vehicles. See U.S. Pat. Nos. 3,122,244, 3,259,365 and 4,101,038. Since battery packs are usually so heavy that they cannot be readily pushed or pulled by a man along the horizontal support, a winch has been used in the prior art apparatus having a horizontal support to pull a cable or rod which is connected to the battery pack to move the battery pack into and out of the battery compartment. See the aforementioned U.S. Pat. Nos. 3,122,244, 3,259,365 and 4,101,038. In U.S. Pat. No. 4,101,038, it is suggested that a pulley may be connected to a stationary structure associated with a vehicle having a battery pack removed in a position which is on the side of the vehicle opposite a service rack which horizontally supports the battery pack after removal from the vehicle and that a cable which is reeled and unreeled by a winch may be rotated around the pulley and may be secured to the opposite side of the battery pack to cause the battery pack to be pulled into the battery compartment during rotation of the winch.

SUMMARY OF THE INVENTION

The present invention is a battery mover used for horizontally moving battery packs into and out of battery compartments of electrically powered vehicles and battery powered machinery. In electrically powered vehicles, the battery packs are mounted in a battery compartment which extends transverse to the vehicles frame and which is closed from the top thereby preventing vertical removal of the battery packs by conventional lifting apparatus.

The invention is particularly useful because all of the structural elements are mounted on the battery mover in a configuration which permits a battery to be moved by a winch into and out of a battery compartment without either removal of any of the structural elements such as a winch or the placement of any structural parts on the battery compartment such as a pulley as suggested in U.S. Pat. No. 4,101,038. The invention is further useful because it provides a support frame for a battery pack which has been removed from a battery compartment which is sufficiently rugged and has sufficient floor clearance so that conventional lifting apparatus such as a fork lift or pallet jack may be used to move the battery pack from proximity to the battery compartment to remote locations where the battery pack may be serviced.

A battery mover in accordance with the invention includes a horizontal support frame having a longitudinal axis along which are disposed a plurality of rotatable elements which permit a battery disposed on the frame to be moved along the longitudinal axis, a vertical member joined to the horizontal frame member, apparatus for aligning the horizontal frame with respect to a battery compartment and for preventing movement of the horizontal frame with respect to the battery compartment when the horizontal frame is disposed in contact with the battery compartment, a winch disposed on the vertical member for reeling and unreeling a cable, a pusher slidably mounted in the horizontal frame which is movable between first and second longitudinal positions along the horizontal frame which engages the edge of the battery disposed on the horizontal frame during movement of a battery toward the first position, apparatus for coupling the pusher to the cable for causing the pusher to move longitudinally along the horizontal support frame toward the first longitudinal position during rotation of the winch and apparatus adapted for coupling the cable to a battery for causing a battery to be moved along the horizontal support frame toward the second position during the rotation of the winch.

DESCRIPTION OF THE PREFERRED EMBODIMENT

Figure 1:
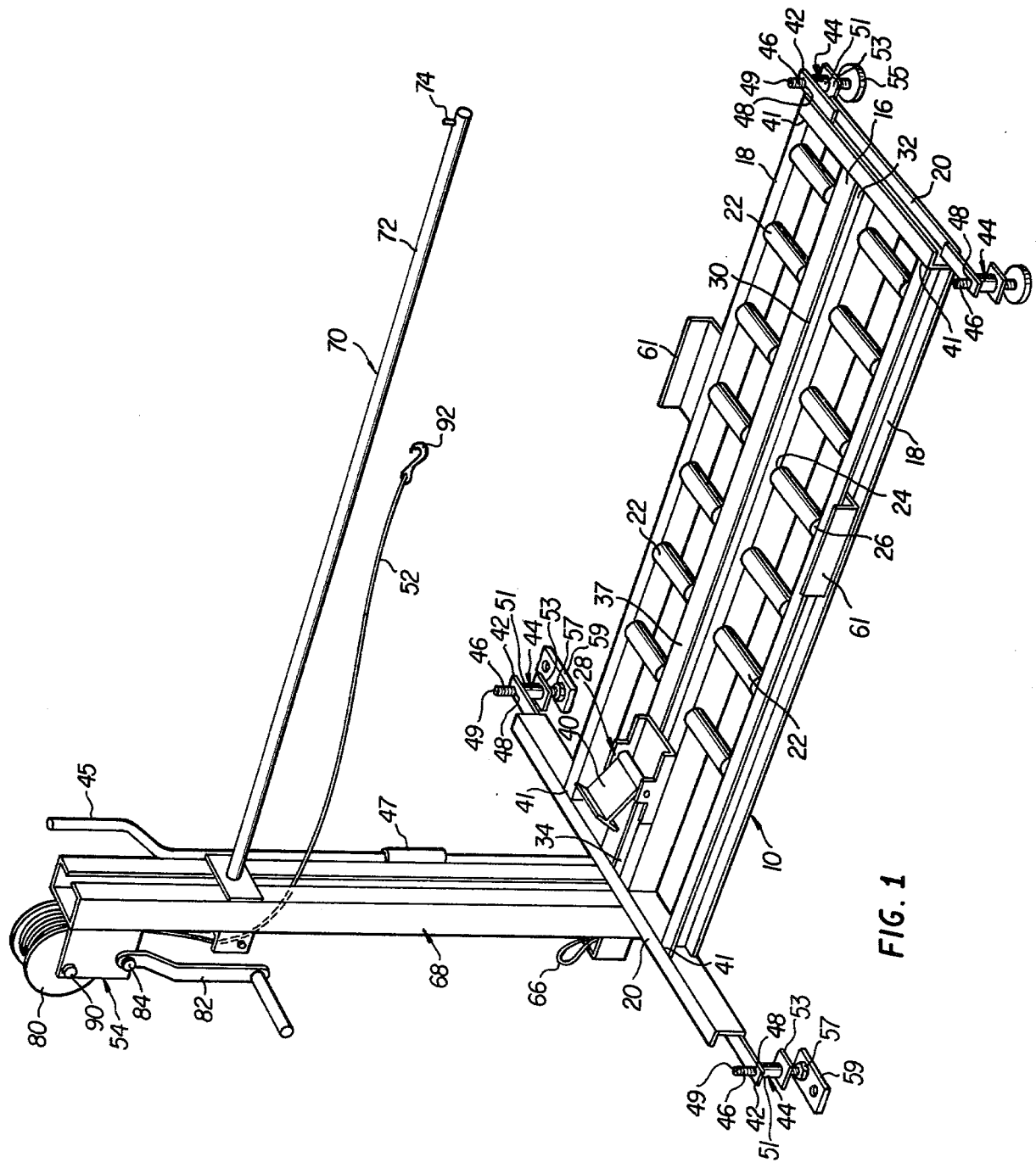
FIG. 1 is a perspective view of a battery mover in accordance with the invention.
Figure 2:
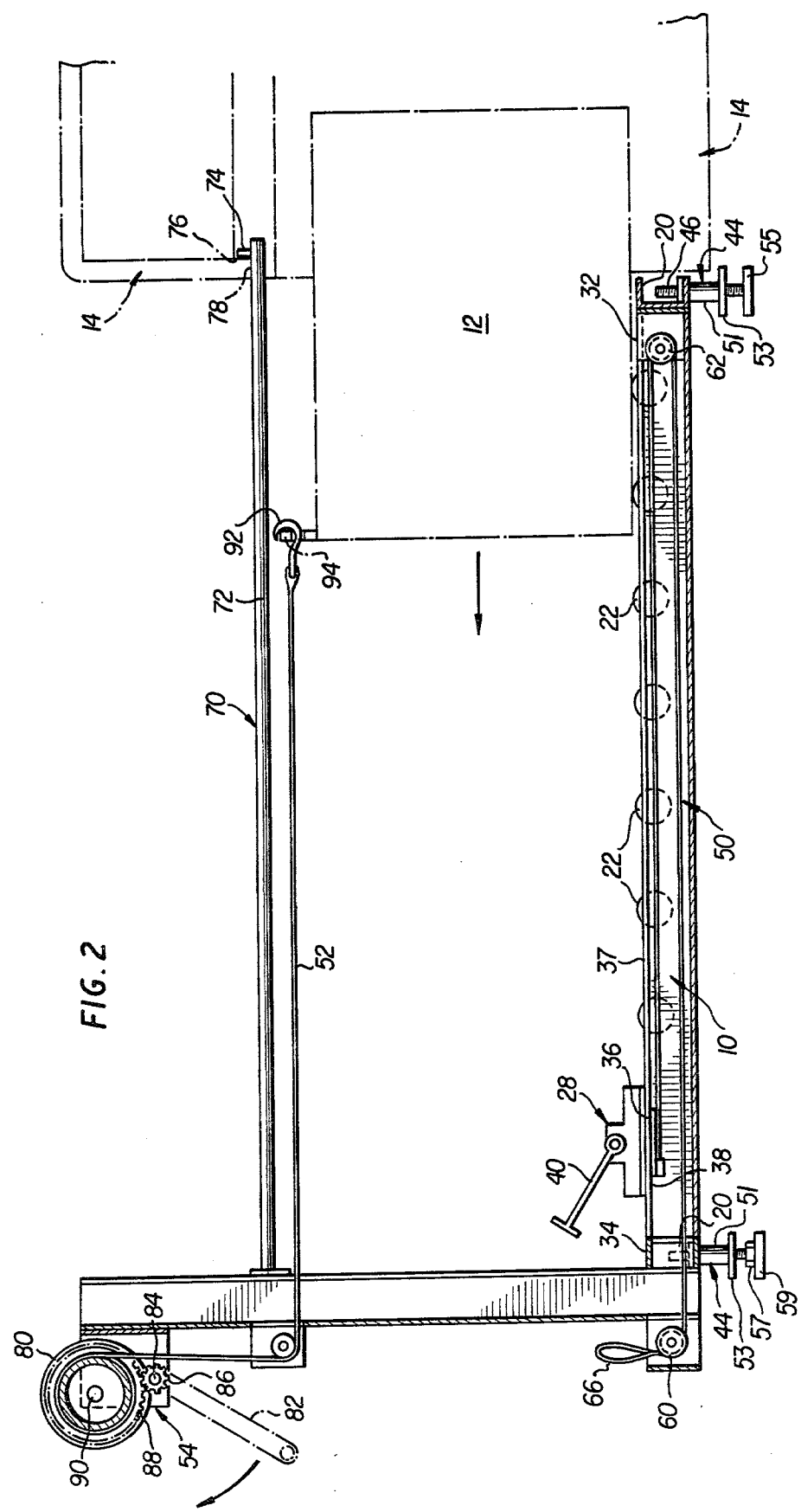
FIG. 2 is a side elevation sectional view of the battery mover illustrating movement of a battery pack from a battery compartment along the horizontal support frame.
Figure 3:
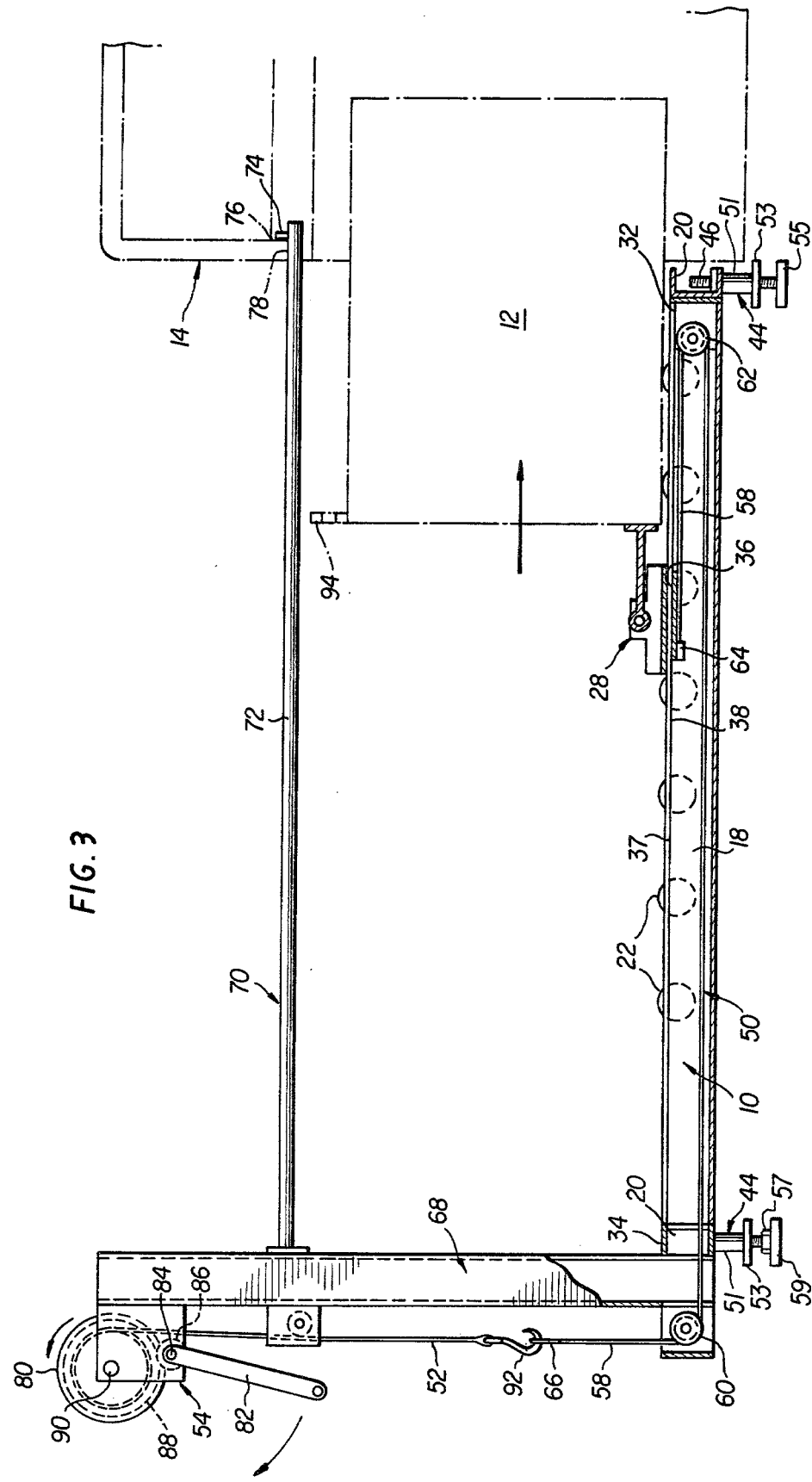
FIG. 3 is a side elevation sectional view of the battery mover illustrating movement of a battery pack from the horizontal support frame to a battery compartment.

FIGS. 1–3 illustrate a battery mover in accordance with the present invention in which like reference numerals are used to refer to like parts.

A rectangular horizontal support frame 10 functions to rotatably support a battery 12 for horizontal movement into and out of a battery compartment 14 which is associated with battery powered vehicles or battery powered machinery. The support frame includes a center longitudinally extending section 16 and two longitudinally extending side sections 18 which are equally spaced from and parallel to the center longitudinally extending section. A pair of end sections 20 are individually joined to the two longitudinally extending side sections to form the rectangular frame. A plurality of rollers 22, each having two ends 24 and 26, are respectively journaled in the center longitudinally extending section 16 and one of the longitudinally extending side sections 18. A slidably mounted pusher 28 is mounted in a longitudinal slot 30 which is disposed in the center of the center longitudinally extending section 16. The pusher 28 is movable longitudinally between a first position 32 and a second position 34 for use in pushing a battery along the longitudinal axis of the support frame from the second position to the first position to push a battery into the battery compartment 14. The slidable mounted pusher 28 is joined to the center longitudinally extending section 16 by an inverted T-shaped section. The base of the T-shaped section is joined to the surface of the pusher which rides on the top surface 37 of the center longitudinally extending section 16 and extends through the slot 30. The top of the T-shaped section 36 bears on the underside 38 of the center longitudinally extending section 16. The pusher 28 includes an extender 40 which is rotatably mounted transversely to the slot 30 of the horizontal support frame 10 to permit positioning in a first or a second position. In the first position, when the extender is rotated to a point facing in the first position 32 of the pusher, the extender 40 projects over the farthest extension of the pusher. When the extender 40 is positioned in the first position, movement of the pusher 28 toward the first position 32 causes the extender to push a battery 12 along the longitudinal axis of the support frame 10 and completely off the horizontal support frame when the pusher is located in the first position 32. When the extender 40 is positioned in the second position, the extender does not apply force to a battery located on the horizontal support frame.

The end sections 20 extend out past the points of juncture 41 with the side longitudinal extended sections 18. Vertical height adjusting apparatus 44 are located at the ends of the four longitudinally extending side sections 42 which are used to adjust the height of the horizontal support frame 10 above the surface on which the battery mover is resting and for leveling the horizontal frame 10. Preferably, each of the vertical adjusting apparatus 44 nearest first position 32 contains a threaded rod 46 which engages a correspondingly threaded section 48 of the extension of the end sections 20 located in proximity to the end 42 of the longitudinally extending side sections 18, a grease fitting 51, a nut 53, and a thrust bearing 55. Each of the vertical adjusting apparatus 44 nearest second position 34 contains a threaded rod 46 which engages threaded section 48, a grease fitting 51, nuts 53 and 57, and anchor plate 59. Height and leveling of the horizontal support frame 10 may be adjusted by rotating the threaded rod 46 associated with each of the height adjusting apparatus 44 by a wrench 45 having a pin (not shown) which engages a vertical slot 49 in threaded rod 46. Wrench 45 may be stored in sleeve 47 mounted on the vertical section 68.

The horizontal support frame 10 further includes a pair of longitudinally extending battery guides 61 which function to align a battery with the longitudinal axis of the horizontal support frame and prevent movement of the battery 12 transverse to the longitudinal slot 30. The horizontal support frame 10 also includes apparatus 50 for coupling the pusher 28 to the cable 52 to move the pusher 28 longitudinally along the slot 30 in the horizontal frame 10 toward the first longitudinal position 32 during rotation of a winch 54 which will be described hereinafter. The apparatus 50 comprises a section of cable 58 which is rotatably supported by a pair of pulleys 60 and 62 which are respectively mounted in proximity to the second position 34 and the first position 32 of the horizontal support frame 10, a mechanical coupler 64 which is connected to the pusher 28 and a mechanical coupler 66 which selectively engages cable 52.

A vertical section 68 is joined to the horizontal support frame on which is mounted the winch 54. The winch 54 functions to reel and unreel the cable 52 which is used for applying a horizontal force to a battery to cause movement of the battery along the longitudinal axis of the horizontal support frame 10 either toward the first position 32 or toward the second position 34 in a manner to be hereinafter described. The vertical section 68 also contains a locating apparatus 70 which functions to align the horizontal frame member with respect to the battery compartment 14 and which functions to prevent movement of the horizontal support frame 10 when the end section 20 located farthest from the vertical section 68 is in contact with the battery compartment 14. The locating apparatus 70 includes a horizontally extending rod 72 which is located vertically above the horizontal support frame 10 and which is substantially parallel to the horizontal support frame. A vertically extending pin 74 is located at the end of the horizontally extending rod 72 which contacts the inner side 76 of the battery compartment when the end section 20 in in contact with the battery compartment 14. The horizontal rod 72 may be adjusted in height to accommodate battery compartments having an opening defined by a top section 78 of differing height. The winch 54 includes a reel 80 on which the cable 52 is reeled and unreeled by turning a handle 82 which is joined to a shaft 84 to which is joined a gear 86 which meshes with a corresponding gear 88 which is joined to a shaft 90 which rotatably supports reel 80 during rotation of the handle 82. The winch 54 may include a ratchet mechanism, not illustrated, which permits the reel 80 to be turned in only one direction during the movement of a battery 14 along the horizontal support frame 10 toward the first position 32 or toward the second position 34. A mechanical coupler 92 is joined to the end of the cable 50 for permitting the selective attachment of the cable to either the battery 12 at an attachment point 94 or to loop 66 located at the end of the cable section 58 of the apparatus for coupling the pusher 28 to the cable 52.

The removal of a battery 12 from a battery compartment 14 is performed as follows. Initially the battery mover is positioned with respect to the battery compartment 14 such that the end section 20 located in proximity to the first longitudinal position 32 of the horizontal support frame 10 is in surface contact with the battery compartment 14 and the pin 74 of the horizontally extending rod 72 engages the inside surface 76 of the opening of the battery compartment as illustrated in FIG. 2. Then the mechanical coupler 92 is coupled to the attachment point 94 of the battery 12 as illustrated in FIG. 2. The winch is rotated to cause the cable 52 to be reeled onto the reel 80 to cause a horizontal force to be applied to the battery 12 which causes the battery to be pulled out of the battery compartment 14 onto the plurality of rollers 22 disposed along the longitudinal axis of the horizontal support frame 10. The winch is progressively rotated to wind the cable on the reel 80 to cause the battery 12 to be moved successively along the longitudinal axis of the horizontal support frame toward the second position 34. The pusher 28 does not function in the removal of the battery 12 from the battery compartment 14. Once the battery is located at the second position 34 on the horizontal support frame 10, a suitable mechanical lifting device such as a fork lift or pallet jack may be used to lift the entire battery mover and transport it to a location where the battery may be serviced in view of the rigidity of the horizontal frame member 10 and the clearance between the support surface on which the height adjusting apparatus 44 rest and the horizontal support frame.

FIG. 3 illustrates the operation of the invention to push a battery from the second position 34 of the horizontal support frame 10 into the battery compartment 14. Initially, the horizontal support frame is in position with respect to the battery compartment 14 by the locating apparatus 70 as described in FIG. 2, supra. The extender 40 is rotated into the first position so that it overhangs the edge of the pusher 28 in a direction facing the first position 32. The mechanical coupler 92 is coupled to the loop 66. Thereafter, the winch is rotated in the same direction used for pulling the battery from the battery compartment to cause the extender 40 to push the battery 12 toward the battery compartment 14. When the winch has been rotated such that the pusher 28 has been moved to the first position 32, the battery 12 is pushed completely off of the horizontal support frame 10 by the extender 40. Thereafter, the battery mover may be removed from the premises by deflecting the rod 72 downward to clear the vertical projecting pin 74 from engagement of the inside surface 76 of the battery compartment 14 and withdrawing the rod from the opening of the battery compartment.

The terminology "cable" as used in the specification means any type of coupling element such as a rope, chain, or cable, etc. which may be wound on the reel of winch 54.

The various parts of the invention may be coated with electrical insulating materials or made with insulating materials to preclude electrical discharge of the battery in the battery mover during use of the present invention.

In some instances, it may be desirable to anchor the battery mover to the floor or to mount two or more battery movers on an apparatus, such as one having a carriage riding on a track, which permits movement of the battery movers in a direction transverse to the longitudinal axes of their horizontal support frames. For example, if two battery movers were mounted on such an apparatus, the carriage could be moved transversely until one of the battery movers was positioned adjacent a battery compartment containing a battery to be removed and the battery could be removed from the compartment as described above. The carriage could then be moved until a second battery mover having a new battery disposed thereon was positioned adjacent the empty battery compartment. The new battery could then be moved into the compartment as described above. Use of such an apparatus would permit more efficient removal and replacement of batteries from battery compartments.

What is claimed is:

1. A battery mover comprising:
   (a) a horizontal frame having a longitudinal axis along which are disposed a plurality of rotatable elements which permit a battery disposed on the frame to be moved along the longitudinal axis, the horizontal frame member having a section which is adapted to be disposed in contact with a battery compartment,
   (b) a vertical section joined to the horizontal frame,
   (c) a locating means for aligning the horizontal frame with respect to a battery compartment which contains a battery to be moved and for preventing movement of the horizontal frame with respect to the battery compartment when the section of the horizontal frame is disposed in contact with the battery compartment,
   (d) a winch disposed on the vertical member for reeling and unreeling a cable,
   (e) a pusher slidably mounted in the horizontal frame which is movable between first and second longitudinal positions along the horizontal frame, the pusher engaging the edge of a battery disposed on the horizontal frame during movement of a battery toward the first longitudinal position,
   (f) means mounted on the battery mover for coupling the pusher to the cable for causing the pusher to move longitudinally along the horizontal frame member toward the first longitudinal position during rotation of the winch, and
   (g) means for coupling the cable to a battery for causing a battery to be moved along the horizontal frame toward the section position during rotation of the winch.

2. A battery mover in accordance with claim 1, wherein the locating means is joined to the vertical section at a point located above the horizontal frame and is substantially parallel to the longitudinal axis of the horizontal frame.

3. A battery mover in accordance with claim 2, wherein the pusher further comprises an extender joined to the pusher, the extender being positionable in first and second positions, the extender in the first position projecting past the farthest extension of the pusher facing the first longitudinal position whereby the extender forces a battery disposed on the horizontal frame completely off of the horizontal frame when the pusher is in the first position.

4. A battery mover in accordance with claim 3, wherein the means for coupling the pusher to the cable comprises:
   (a) a section of cable which is adapted to be connected to the cable which is reeled and unreeled by the winch and is connected to the pusher,
   (b) a first pulley journaled in the horizontal frame in proximity to the first longitudinal position, the pulley rotatably supporting the section of cable, and
   (c) a second pulley journaled in the vertical section which rotatably supports the section of cable.

5. A battery mover in accordance with claim 4, wherein the locating means comprises a horizontally projecting rod and a vertically projecting pin located at the end of the horizontally projecting rod which is disposed farthest from the vertical section.

6. A battery mover in accordance with claim 5, wherein the horizontal frame comprises a center longitudinally extending section and two side longitudinally extending sections which are substantially parallel to the center longitudinally extending section, and two end sections individually disposed at opposite ends of the longitudinal center and side sections, one end section being joined to one end of the center and side sections and the other end section being joined to the other end of the center and side sections to form a rectangular frame.

7. A battery mover in accordance with claim 6, wherein
   (a) the end sections each have two ends which project past the point of juncture of the end section with the side sections, and
   (b) a vertical height adjusting means is disposed in proximity to each of the ends of the end sections for adjusting the height and level of the horizontal frame member.

8. A battery mover in accordance with claim 7, wherein
   (a) a pulley is journaled in the vertical section for rotatably supporting the cable which is reeled and unreeled by the winch, and
   (b) the winch includes a ratchet for permitting the winch to be rotated in only one direction.

9. A battery mover in accordance with claim 8, wherein (a) the horizontal frame includes means for aligning a battery with the longitudinal axis of the horizontal frame member, and (b) the rotatable elements each have two ends, one of the ends of each rotatable element being journaled in the center longitudinally extending section and the other end being journaled in one of the side longitudinally extending sections.

10. A battery mover in accordance with claim 9, wherein (a) the locating means is vertically adjustable; and (b) the winch includes a ratchet and panel mechanism which allows rotation of the cable in only one direction.

* * * * *